Figure 4:
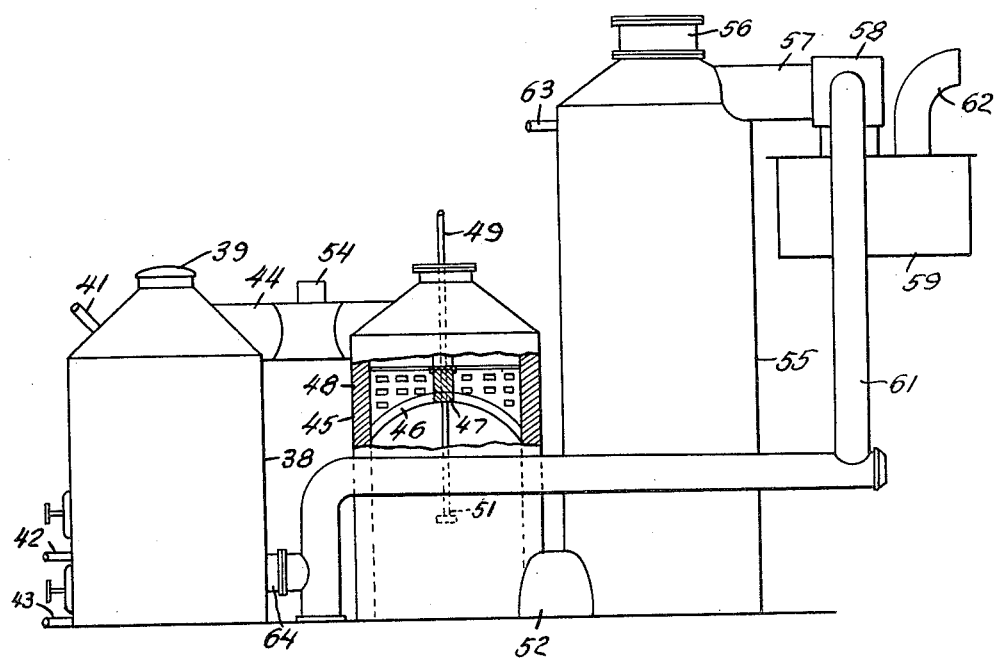

Dec. 15, 1936.  C. H. HUGHES  2,064,006
CARBURETOR FOR CARBURETED WATER GAS SETS
Filed June 5, 1931   3 Sheets-Sheet 1
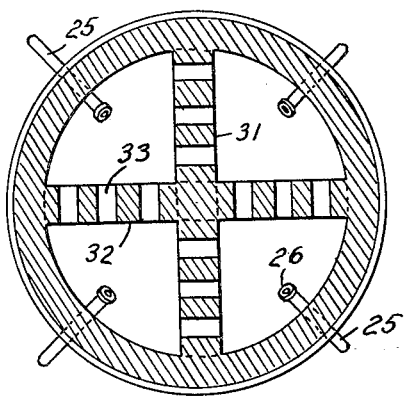
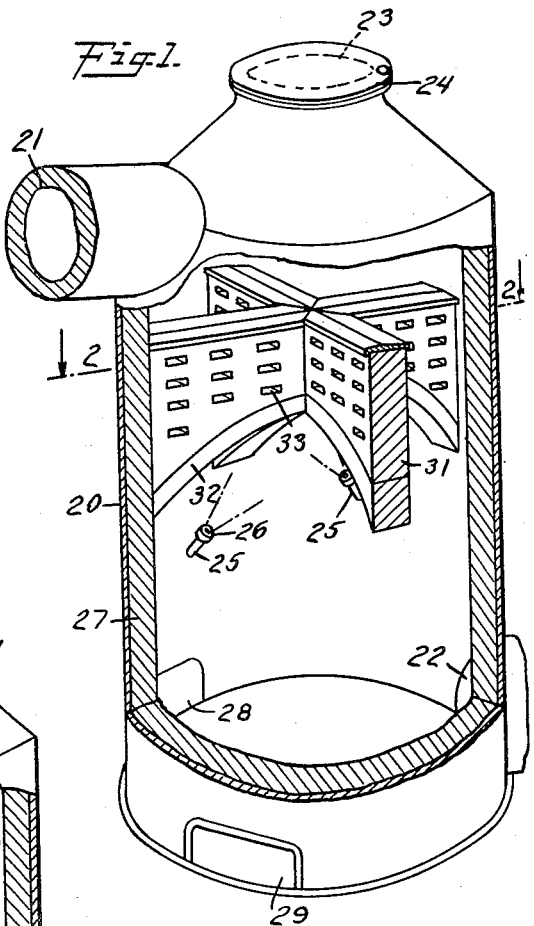
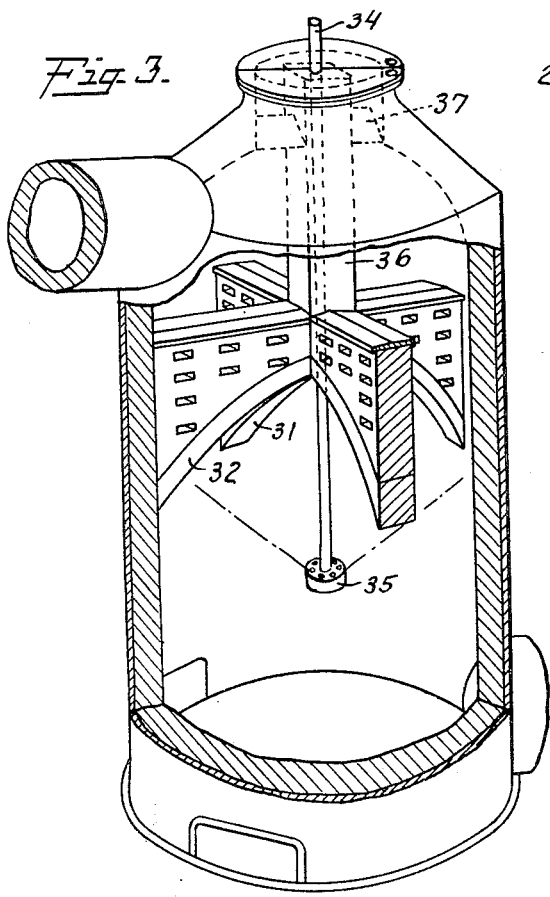
INVENTOR
Charles H. Hughes
BY
ATTORNEY Dec. 15, 1936.  C. H. HUGHES  2,064,006
CARBURETOR FOR CARBURETED WATER GAS SETS
Filed June 5, 1931   3 Sheets-Sheet 2

INVENTOR
Charles H. Hughes
BY
ATTORNEY

Dec. 15, 1936.   C. H. HUGHES   2,064,006
CARBURETOR FOR CARBURETED WATER GAS SETS
Filed June 5, 1931   3 Sheets-Sheet 3
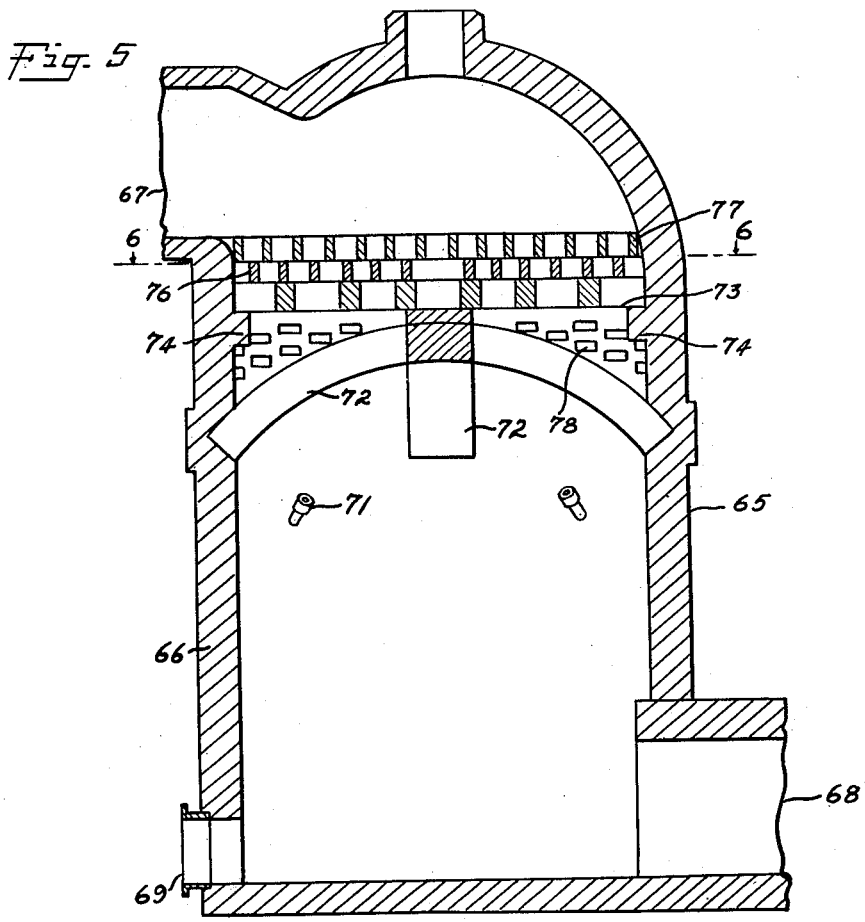
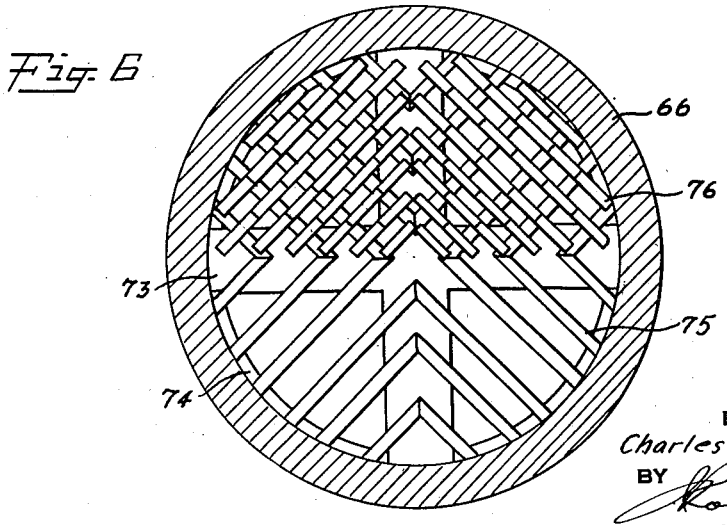
INVENTOR
Charles H. Hughes
BY
ATTORNEY Patented Dec. 15, 1936

2,064,006

UNITED STATES PATENT OFFICE 2,064,006

CARBURETOR FOR CARBURETED WATER GAS SETS

Charles H. Hughes, Glen Ridge, N. J., assignor to Semet-Solvay Engineering Corporation, New York, N. Y., a corporation of New York Application June 5, 1931, Serial No. 542,271

16 Claims. (Cl. 48—79)

This invention is directed to the manufacture of carbureted water gas and more particularly to the construction and operation of a carbureted water gas set involving a generator, carburetor and superheater connected in series.

One object of this invention is to provide a carbureted water gas set, the carburetor of which is designed to permit enrichment of the water gas passed therethrough with Bunker-C or crude oils which, upon passage through the heated carburetor, leave a solid carbonaceous residue.

Another object is to provide a process of making carbureted water gas in a carburetor of such construction and design that the blast gases admixed with secondary air passed through the carburetor are immediately ignited and burned upon the entrance into the carburetor, thus efficiently utilizing both the sensible and latent heat of the blast gases in the heating of the carburetor during the blasting cycle. During the subsequent gas-making cycle, the carburetor of this invention functions to accomplish efficient vaporization and admixture of the oil introduced thereinto with the water gas passed therethrough. Further, the carburetor is provided with a base entirely free of obstructions wherein the carbonaceous material may settle without interfering with the gas flow through the carburetor and from which the carbonaceous residue may be readily withdrawn.

Heretofore, the usual water gas set consisted of a generator containing a bed of fuel and a carburetor and a superheater connected in series with the generator. The interiors of both the carburetor and the superheater were built up with checkerbrick material arranged in staggered relation to form tortuous flues. In the manufacture of water gas the blast gases produced in the generator by the passage of air or other oxygen-containing gas through the fuel bed therein, were discharged from the generator and passed into and through the carburetor and superheater. Secondary air admitted to the carburetor and the superheater was admixed with the blast gases and this mixture was ignited in its passage over the checkerbrick and burned in these chambers, thus heating the checkerbrick. This blasting cycle lasted approximately three minutes.

Thereafter it was discontinued and the steam, admitted into the generator, passed therethrough reacting with the fuel bed therein to produce water gas which was passed into the carburetor. Oil was introduced into the top of the carburetor, the resultant oil gas mixing with the water gas passing over the checkerbrick therein. The mixture of oil gas and water gas in its passage through the carburetor and superheater chambers was fixed to form carbureted water gas. Thereafter, if desired, steam was passed in reverse flow through the superheater and carburetor units down through the fuel bed in the generator, the resultant water gas being withdrawn directly from the base of the generator. When the temperatures of the fuel bed and the carburetor and superheater chamber had been reduced so that water gas could no longer be generated, the gas-making cycles were discontinued and the fuel bed again blasted with air or other oxygen-containing gas, and upon completion of this blasting cycle, the water gas-making cycles were repeated.

It has been proposed to substitute for the usual enriching oil, which does not form substantial carbonaceous deposits on the checkerbrick, Bunker-C, crude, or unrefined oils. In practice, however, it has been found that such oils leave an increased carbonaceous deposit on the checkerbrick in the carburetor, clogging the flues and necessitating frequent shut-downs for recheckering. The arrangement of checkerwork in the carburetor precludes the cleaning thereof without removal of the checkerbrick from the carburetor chamber and consequently the entire checkerwork had to be replaced, thus entailing arduous and time-consuming labor and reducing the gas-making capacity of the plant, since the carburetor had to be taken out of operation for a considerable period of time.

In accordance with Doherty Patent No. 992,944, of May 23, 1911, the amount of checkerbrick in the carburetor of a water gas set has been reduced and the carbureting oil has been introduced into an unobstructed space at the top of the carburetor, into the downwardly flowing water gas stream, so as to obtain substantially complete volatilization of the oil before it contacts with hot checkerbrick to thereby reduce or eliminate the formation of carbonaceous deposits. Further, in view of the clogging of the checkerbrick when using Bunker-C or crude oils, it has been proposed to omit the checkerbrick in the carburetor and introduce Bunker-C or crude oil as the enriching medium into the top thereof, the oil gas and water gas flowing in the same direction down through the carburetor into the base of the superheater and up therethrough. Operating in this manner during the blasting cycle, blast gases sweep through the carburetor without substantial ignition thereof and consequently only a portion of the sensible and little or none of the latent heat of the gases is effective in heating the carburetor. Furthermore, operation in this manner creates a serious danger of the non-ignited mixture of air and blast gases exploding in the carburetor.

In contradistinction to the above constructions, the carburetor of my invention is provided with an ignitor construction within the carburetor, arranged prior to the point of introduction of the oil, which is introduced into the carburetor in a direction countercurrent to the flow of water gas therethrough, and as a result of the countercurrent flow of oil and gas, the oil is more efficiently vaporized and admixed with the water gas and the tendency toward carbon formation reduced. The ignitor is preferably constructed of massive walls, which may be arranged laterally of the carburetor at a point adjacent the gas inlet, the walls functioning as heat reservoirs and ignitors to cause ignition of the mixture of blast gases simultaneously with their introduction into the carburetor during the blasting cycle. The enriching medium is introduced at a point below the series of walls, remote from the water gas inlet of the carburetor, in a direction countercurrent to the flow of water gas, and is substantially completely vaporized during its countercurrent flow, the oil vapors mixing with the water gas and passing therewith through the carburetor, the carbonaceous material resulting from the vaporization of the oil falling to the base of the carburetor which is entirely free of obstruction. It will be noted that in accordance with this invention, the carburetor is designed to immediately ignite the blast gases upon their entrance into the chamber to obtain the full value of the sensible and latent heat of the blast gases as they pass through the vaporizing chamber, and also to eliminate the explosion hazard hereinabove mentioned. Further, this invention permits enrichment of the water gas with Bunker-C or crude oil, the carbonaceous residue formed in the carburetor settling to the unobstructed base thereof where it does not interfere with the flow of gas through the carburetor and from whence it may be readily withdrawn through clean-out doors provided at the base of the carburetor.

Other objects and advantages of the present invention will be apparent from the following description.

In the accompanying drawings forming a part of this specification and showing for the purpose of exemplification preferred forms of the invention, but without limiting the claimed invention to such illustrative instances:

Fig. 1 is a perspective view, partly in section, of a carburetor of a water gas set illustrating a preferred embodiment of my invention; Fig. 2 is a section taken on the line 2—2 of Fig. 1; Fig. 3 is a perspective view, partly in section, of a modified carburetor construction; Fig. 4 is a side elevation, partly in section, of a water gas set embodying still a further modified form of the carburetor of my invention; Fig. 5 is a vertical section, partly in elevation, of a further modified form of the carburetor of my invention; and Fig. 6 is a section taken on the line 6—6 of Fig. 5.

With reference to Fig. 1, the numeral 20 designates a cylindrical shell carburetor of the type generally used in connection with a water gas set comprising a generator, carburetor and superheater. An inlet 21 leading from a generator, such as generator 38 of Fig. 4, is provided for conducting gases from the generator into the top of the carburetor. An outlet 22 is provided for conducting the enriched gases from the carburetor to a superheater, such as superheater 55 of Fig. 4. The top of the carburetor shell, which is preferably of conical shape, is provided with a manhole 23 provided with a readily removable cover 24. Spray pipes 25 provided with discharge nozzles 26 are disposed in the walls of the carburetor and are adapted to discharge an enriching medium upwardly into the carburetor. The disposition of the pipes 25 is such as to provide one pipe in each 90° sector. A lining 27 of refractory material, such as firebrick or the like, is provided within the carburetor.

Ports 28 and 29 are provided in the base of the carburetor to serve as clean-out openings for the removal of carbonaceous material deposited as a result of the cracking of the enriching medium introduced through the spray pipes 25. The openings 28 and 29 are provided with any conventional closure means. Within the carburetor shell and adjacent the upper one third thereof is a series of intersecting arched walls 31 and 32 of massive construction which are bonded at their extremities with the refractory lining 27 of the carburetor and which rise to a point of intersection substantially on the axis of the carburetor and immediately below the gas inlet 21. A series of four walls are preferably provided, the walls intersecting at the center of the carburetor at right angles to define 90° sectors, each sector containing one oil spray pipe 25 as above described. The arched walls 31 and 32 are preferably composed of refractory brick laid to provide openings 33 and may be coped with a suitable high temperature heat-resistant alloy, for example, the alloy known commercially as "Fahrite" which contains 40% nickel, 20% chromium and 40% iron and which will stand temperatures of 2000° F. I have found that the lining of such refractory walls with high temperature heat-resistant metal such as "Fahrite" is particularly advantageous since the metal has a tendency to prevent the adherence of carbon particles thereto. This characteristic of preventing adherence of carbon is particularly pronounced in nickel or nickel alloys.

The modified form of my invention shown in Fig. 3 differs from the embodiment shown in Fig. 1 and described above chiefly in the construction of the interior walls and the position of the point of oil introduction. The oil is introduced through a pipe 34 extending through the top of the carburetor and terminating in a discharge nozzle 35 adapted to discharge the oil upwardly toward the arched walls 31 and 32. The upper portion of the pipe adjacent the gas inlet is protected from the high temperatures experienced in the carburetor by a surrounding column 36 of refractory material which extends from the point of intersection of the arched walls 31 and 32 to the top of the carburetor, suitable brace members 37 being provided to ensure rigidity of construction. Otherwise the construction of the carburetor is substantially the same as that shown in Fig. 1.

It will be noted in the above modifications of my invention that the bottom of the carburetor is entirely free of obstructions and is readily accessible for cleaning purposes through the ports 28 and 29. The arched walls 31 and 32 are provided immediately adjacent the gas inlet opening 21 so that the gases entering the carburetor will immediately contact with said walls and thereafter pass to the vaporizing chamber defined between the bottom of arched walls 31 and 32 in the base of the carburetor.

In Fig. 4 I have shown the carburetor of my invention as employed in a water gas set wherein 38 designates a water gas generator containing a body of fuel (not shown). A charging opening 39 for fuel is provided at the top of the generator. Steam may be supplied to the carburetor through pipes 41 and 42 and air for blasting the fuel within the generator may be supplied through air blast pipe 43. The generator 38 communicates through the pipe 44 with the top of the carburetor 45 which contains intersecting arched walls 46 and 47 and refractory lining 48 of types similar to those shown in Figs. 1 and 3.

Means may be provided for introducing an enriching medium such as oil into the carburetor, said means preferably comprising a pipe 49 extending downwardly from the top of the carburetor to a point below the arched walls 46 and 47 and terminating in a spray nozzle 51 adapted to discharge the oil upwardly into the downwardly flowing stream of water gas. A conduit 52 connects the bottom of the carburetor 45 to the superheater 55. The superheater is provided with a stack 56 for the discharge of waste gases during the blasting cycle and an offtake 57 which leads from the top of the superheater to a housing 58 and a wash box 59. Secondary air opening 54 is provided for the admission of air into the carburetor during the blasting cycle. A conduit 61 leads from the base of the generator 38 to the housing 58. A suitable valve is positioned in housing 58 to control flow through the set as is well known.

The operation of the above described set comprises three cycles, to wit: a "blasting cycle", an "uprun" and a "backrun". In the "blasting cycle" air is passed into the generator through line 43 and passes through the fuel bed therein, raising the temperature thereof until the fuel becomes an incandescent mass. The resultant blast gases are passed into the carburetor 45 through the conduit 44. Secondary air is admitted to the carburetor at 54. The mixture of air and gas is immediately ignited upon contacting with the arched walls 46 and 47 mounted adjacent the gas inlet of the carburetor. As a result, the arched walls 46 and 47 and the refractory lining 69 throughout the length of the carburetor become very highly heated because of the combustion of the mixture of blast gases and air during its passage through the carburetor. The gases pass through the carburetor through conduit 52 into superheater 55. The waste gases, after heating the interior of the superheater, are discharged through the stack 56.

When the arched walls 46 and 47, refractory lining 48 and the interior of the superheater 55 have been brought to the requisite temperatures, the flow of air to the generator is shut off and the "uprun" cycle begun. Steam is passed into the base of the generator through inlet 42 and passes up through the fuel bed reacting therewith to form water gas. The water gas formed as a result of the reaction between the steam and hot fuel, passes through inlet 42 to the carburetor 45 wherein it is carbureted or enriched by the addition of oil through the spray nozzle 51. The oil is discharged into the carburetor in an upward direction below the arched walls 46 and 47, is carried in suspension in contact with the oppositely flowing water gas and is efficiently volatilized and cracked with the production of carbonaceous material and oil gas by reason of the transfer of heat from the refractory lining and the arched walls. Introducing the oil in a countercurrent direction results in improved dispersion and admixture of the oil particles and resultant vapors with the water gas, and also, due to greater surface of oil exposed to heat and contact of oil particles with the water gas, the oil is more efficiently cracked and vaporized. The oil gas formed by the vaporization of the upwardly directed suspended oil particles becomes intimately mixed with the water gas by reason of the agitation of the two fluids within the carburetor, resulting from the counter-flow, forming a zone of volatilized oil adjacent the massive walls in the upper portion of the carburetor which act as a reservoir of heat thus aiding in securing efficient volatilization and cracking of the oil. The carbonaceous material settles into the large unobstructed spaces at the base of the carburetor where it accumulates without interfering with the flow of the gas through the carburetor. The high temperature present in the carburetor as a result of the heat contained in the walls of checkerwork partially fixes the mixture of the oil gas and water gas and assists in the production of a fixed homogeneous product. The resultant mixture passes from the carburetor through the conduit 52 to the superheater 55 wherein fixation is completed. From the superheater the water gas formed passes into the wash box 59 from which it is led through outlet 62 to a suitable holder.

The "steam uprun" period may be immediately followed by a "steam backrun" period. Conduit 57 is closed to the flow of gas, and steam is admitted at 41 or 63, the inlets 42 and 43 being closed. The steam admitted at 63 is superheated in its passage through the superheater and the carburetor and passes into the top of the generator and downwardly through the fuel bed therein. The water gas formed passes out of the generator at 64 through the conduit 61 to the wash box 59, thereafter being conducted to a suitable holder.

During the carburetion step due to the cracking of the oil, particularly when Bunker-C or unrefined oils are employed, large amounts of carbonaceous material are formed and deposited on the walls and the base of the carburetor. To remove the carbon deposit and clean the carburetor walls and the refractory walls, it is only necessary to shut off the flow of gas, open the manhole provided in the top of the carburetor and scrape the carbon deposit from the lining and arched walls with any suitable tool. The carbon falls to the bottom of the chamber from which it is readily removed through the clean-out ports provided at the bottom of the shell, the time consumed in the cleaning operation being of the order of 30 minutes. Thus it is evident that the water gas set need be shut down for only a very short period of time, after which operation may again be resumed.

To further the even distribution of gases within the carburetor of my invention, I may provide a carburetor of a modified form of construction as shown in Figs. 5 and 6 wherein a carburetor 65, provided with a lining 66 of refractory material, is shown. An inlet 67 is provided at the top of the carburetor by means of which gases may be introduced into the carburetor from a generator of the type similar to that shown in Fig. 4, and an outlet 68 is provided adjacent the bottom of the carburetor to pass gases from the carburetor to a superheater which may also be of the type shown in Fig. 4. A cleanout opening 69 is provided adjacent the bottom of the carburetor analogous to the openings 28 and 29 of the carburetor of Fig. 1 and allows access to the bottom of the carburetor at desired intervals for the removal of the carbonaceous material deposited therein.

Oil sprays 71 and arched walls 72 having openings 78, are positioned below the inlet 67 of the carburetor in much the same manner as the sprays and walls of the carburetor shown in Fig. 1. However, between each arched wall 72 and on a level with the top 73 thereof, projections or ring members 74 are formed on the lining 66 of the carburetor and extend around the inner periphery thereof at the upper edge of the arcuate sections of the lining defined by adjacent arched walls 72. Relatively long narrow members or bars 75 of refractory material or the like, are laid adjacent the top of the carburetor immediately above the arched walls 72 so that the ends thereof are supported by and rest on the top 73 of the arched walls 72 and the ring members 74, as shown in Fig. 6. A course 76 of checkerbrick formed of refractory material and of any preferred shape is laid crosswise of the members 75, as shown in Fig. 6 and is supported thereon. A second course 77 of checkerbrick may be built up on the course 76, the two courses of checkerbrick causing uniform distribution of the gases throughout the carburetor.

The advantages of such a construction as shown in Fig. 5 wherein the entering gases are passed through two or more courses of checkerbrick arranged in staggered relation, lies chiefly in the more uniform distribution of the entering gases before their contact with the arched walls 72 and the oil vapor from the sprays 71, i. e., the gases which enter the carburetor from the port 67 are dispersed and changed from a stream of a size approximating the dimensions of the port 67 to a more widely dispersed body flowing through all the parts of the carburetor with equal velocity.

Moreover the staggered arrangement of the successive courses of checkerbrick causes turbulence in the stream of entering gases and a more homogeneous mixture results, particularly when blast gases and air are being introduced into the carburetor during the blasting cycle.

It will be noted that in accordance with my invention, Bunker-C or unrefined oils of low cost may be efficiently utilized in the enrichment of water gas, the large unobstructed space at the base of the carburetor permitting settling of the carbonaceous material formed from the cracking of the crude oil, from which the carbonaceous residue may be readily removed when desired. Furthermore, the refractory material provided in the top of the carburetor adjacent the gas inlet insures immediate ignition of the entering mixture of blast gases and secondary air, thereby making the latent and sensible heat of the gases available for use in heating the vaporizing portion of the carburetor as the ignited gases subsequently pass therethrough. By reason of the coping provided on the upper face of the refractory walls, the carbonaceous material is prevented from depositing and accumulating thereon and instead settles to the unobstructed space provided at the base of the carburetor which is of such size as to eliminate the necessity for cleaning except at relatively long intervals of time. Further, the ignitor within the carburetor eliminates explosion hazards.

The invention as hereinabove disclosed is embodied in particular forms of construction but it is to be understood that it may be variously embodied within the scope of the following claims.

I claim:

1. In a carbureted combustible gas generating set, a carburetor comprising a chamber having a gas inlet and a gas outlet, said chamber containing an unobstructed vaporizing portion located below the gas inlet and occupying the major portion of the volume of the carburetor, and a refractory wall occupying a minor portion of the volume of the carburetor, located above said vaporizing portion and adjacent the gas inlet and disposed from one side of the carburetor to the other, and having its top below the gas inlet, said wall functioning to retain heat and ignite the mixture of air and blast gases upon their entrance to the carburetor during the blasting cycle, and means for introducing oil into the vaporizing portion of the carburetor, said vaporizing portion of the carburetor being disposed beneath the said refractory wall.

2. In a carbureted water gas set, a carburetor comprising a chamber having a gas inlet and a gas outlet, said chamber containing an unobstructed vaporizing portion located below the gas inlet, and a series of massive walls bonded with the lining of said carburetor and rising to a point of intersection immediately below the gas inlet, and means for introducing oil into the vaporizing portion of the carburetor comprising a nozzle adapted to discharge the oil in the vaporizing portion below said massive walls.

3. In a water gas set comprising a generator, a carburetor and a superheater in series, means to introduce blast gases from the generator into the carburetor during the blasting cycle comprising a gas inlet located in the carburetor, means adjacent said gas inlet to introduce secondary air, means to ignite said mixture of blast gases and secondary air immediately upon their entrance into the carburetor, said means occupying a minor portion of the volume of the carburetor leaving the remaining major portion completely unobstructed and comprising a refractory wall disposed from one side of the carburetor to the other, means for introducing oil into said unobstructed portion comprising a nozzle adapted to discharge the oil in a direction counter current to the flow of water gas.

4. In a carbureted water gas set, a carburetor comprising a chamber having a gas inlet and a gas outlet disposed at opposite ends thereof, said chamber containing an unobstructed vaporizing portion occupying a major portion of the volume of the carburetor, and extending to the base thereof, and located below the gas inlet and a refractory wall occupying a minor portion of the volume of the carburetor and located immediately adjacent the gas inlet, said wall functioning to retain heat and ignite the mixture of air and blast gases upon their entrance to the carburetor during the blasting cycle, and means for introducing oil into the vaporizing portion of the carburetor.

5. In a carbureted water gas set, a carburetor comprising a chamber having a gas inlet and a gas outlet, said chamber containing an unobstructed vaporizing portion located below the gas inlet and a series of refractory walls radially disposed in said carburetor to define unobstructed vertical sectors, said walls functioning to retain heat and ignite the mixture of air and blast gases upon their entrance to the carburetor during the blasting cycle, and means for introducing oil into the vaporizing portion of the carburetor comprising a series of circumferentially disposed upwardly-directed nozzles each individual to one of said sectors.

6. In a carbureted water gas set, a carburetor comprising a chamber having a gas inlet and a gas outlet disposed at opposite ends thereof, said chamber containing an unobstructed vaporizing portion located below the gas inlet, and a refractory wall adjacent the gas inlet disposed from one side of the carburetor to the other, said wall functioning to retain heat and ignite the mixture of air and blast gases upon their entrance to the carburetor during the blasting cycle, checkerbrick located above said refractory wall to uniformly distribute and mix said mixture of air and blast gases, said refractory wall and checkerbrick occupying a minor portion of the carburetor, the remaining portion of the carburetor being constituted of said unobstructed vaporizing portion and means for introducing oil into the vaporizing portion of the carburetor.

7. In a carbureted water gas set, a carburetor comprising a chamber having a gas inlet and a gas outlet, said chamber containing an unobstructed vaporizing portion located below the gas inlet and a series of refractory walls radially disposed in said carburetor to define unobstructed vertical sectors, said walls functioning to retain heat and ignite the mixture of air and blast gases upon their entrance to the carburetor during the blasting cycle, a series of courses of checkerbrick disposed above said refractory walls, said checkerbrick functioning to uniformly distribute and mix said mixture of air and blast gases, and means for introducing oil into the vaporizing portion of the carburetor comprising a series of circumferentially-disposed upwardly-directed nozzles, each individual to one of said sectors.

8. In a carbureted water gas set, a carburetor comprising a chamber having a gas inlet and a gas outlet, said chamber containing an unobstructed vaporizing portion, means for passing water gas through said carburetor, means for introducing oil into the vaporizing portion of the carburetor, means for introducing a mixture of air and blast gases into the carburetor, a refractory wall in said carburetor extending from one side to the other side thereof and disposed with its top below the gas inlet for air and blast gases and contiguous thereto, said refractory wall retaining heat and igniting the mixture of air and blast gases upon its entrance into the carburetor during the blasting cycle.

9. In a carbureted water gas set, a carburetor comprising a chamber having a top side gas inlet and a base side gas outlet, a pair of relatively short intersecting walls of refractory material immediately contiguous to the gas inlet, the remainder of the carburetor below said walls being unobstructed throughout the length thereof, and means for spraying oil into the unobstructed portion of the carburetor, comprising oil nozzles adapted to discharge the oil in a direction countercurrent to the flow of water gas down through said carburetor.

10. In a water gas set comprising a generator and a carburetor, means for introducing blast gases from the generator into the carburetor during the blasting cycles and for discharging water gas from the generator into the carburetor during the water gas making cycles, means for introducing secondary air in admixture with the blast gases during the blasting cycles, means for igniting said blast gases and secondary air immediately upon their entrance into the carburetor, said carburetor being substantially completely unobstructed throughout the horizontal cross-sectional area thereof except for said last-mentioned means, said unobstructed portion of the carburetor occupying the major portion of the volume of the carburetor, and means for introducing oil during the passage of water gas through said carburetor, said oil being introduced into said unobstructed portion in a direction countercurrent to the flow of water gas.

11. In a combustible gas set, comprising a combustible gas generator and a communicably connected carburetor, means for introducing blast gases from the generator into the carburetor during the blasting cycles and for introducing combustible gas into the carburetor during the combustible gas making cycles and passing the blast gases and combustible gas down through the carburetor and out from the base thereof, said means comprising a gas inlet located in the carburetor near the top thereof, means adjacent said gas inlet for introducing secondary air into the carburetor during the blasting cycle, means for igniting said mixture of blast gases and secondary air immediately upon their entrance into the carburetor, said last mentioned means being constructed and arranged to permit free flow of gas thereover and occupying a minor portion of the volume of the carburetor, said carburetor being substantially unobstructed below said last-mentioned means, throughout the horizontal cross-sectional area thereof and means for introducing oil into the unobstructed portion of the carburetor during the flow of combustible gas through said carburetor.

12. In a water gas set comprising a generator and a communicably connected carburetor, means for introducing blast gases from the generator into the carburetor during the blasting cycles and for introducing water gas into the carburetor during the water gas making cycles and passing the blast gases and water gas down through the carburetor and out from the base thereof, means for introducing secondary air into the carburetor during the blasting cycles, means for igniting said mixture of blast gases and secondary air substantially immediately upon their entrance into the carburetor, said carburetor containing a space unobstructed throughout the horizontal cross-sectional area thereof occupying the major portion of the carburetor below said last-mentioned means, and means for projecting upwardly directed sprays of oil into said unobstructed space during the downward flow of water gas therethrough.

13. A carburetor comprising a chamber lined with refractory material having a top gas inlet and a bottom gas outlet, a wall of refractory material contiguous to the gas inlet disposed from one side of the carburetor to the other and bonding with the lining of said carburetor, said carburetor being substantially completely unobstructed below said wall, and an oil spray nozzle in said carburetor disposed beneath said wall.

14. In a carbureted water gas set, a carburetor comprising a chamber having a gas inlet and a gas outlet, means in said carburetor disposed contiguous to the inlet to the carburetor to retain heat and ignite the mixture of air and blast gases upon its entrance to the carburetor during the blasting cycle, said carburetor being otherwise unobstructed and containing a vaporizing portion unobstructed throughout the horizontal cross-sectional area thereof located below said means and occupying a major portion of the volume of said carburetor, means for passing water gas through said carburetor and means for introducing oil into the vaporizing portion of the carburetor in a direction countercurrent to the flow of water gas therethrough.

15. In a carbureted water gas set, a carburetor comprising a chamber having a gas inlet and a gas outlet, means in said carburetor disposed contiguous to the inlet to the carburetor to retain heat and ignite the mixture of air and blast gases upon its entrance to the carburetor during the blasting cycle, said means occupying a minor portion of the volume of the carburetor, the remaining portion of the volume of the carburetor being completely unobstructed throughout the horizontal cross-sectional area thereof, means for passing water gas through said carburetor and means for introducing hydrocarbon enriching material into the said unobstructed portion in a direction countercurrent to the flow of water gas through the carburetor.

16. In a carbureted water gas set, a carburetor comprising a chamber having a top inlet and a base outlet, means in said carburetor disposed contiguous to the inlet and extending from side to side of the carburetor to retain heat and ignite the mixture of air and blast gases upon its entrance to the carburetor during the blasting cycle, said means occupying a minor portion of the volume of the carburetor, the remaining major portion of the carburetor, including the base thereof, being completely unobstructed throughout the horizontal cross-sectional area thereof, means for passing water gas downwardly through said carburetor and means for introducing hydrocarbon enriching material into the unobstructed portion of the carburetor in an upward direction countercurrent to the flow of water gas therethrough.

CHARLES H. HUGHES.